United States Patent
Gupta et al.

(10) Patent No.: US 10,341,943 B2
(45) Date of Patent: Jul. 2, 2019

(54) METHOD AND APPARATUS FOR DISCOVERING NEIGHBORHOOD AWARENESS NETWORKING DEVICES USING A SURROGATE DEVICE

(71) Applicant: Motorola Mobility LLC, Chicago, IL (US)

(72) Inventors: Ranjeet Gupta, Chicago, IL (US);
Gabriel Burca, Palatine, IL (US);
Mary Hor-Lao, Chicago, IL (US);
Binesh Balasingh, Naperville, IL (US)

(73) Assignee: MOTOROLA MOBILITY LLC, Chicago, IL (US)

( * ) Notice: Subject to any disclaimer, the term of this patent is extended or adjusted under 35 U.S.C. 154(b) by 109 days.

(21) Appl. No.: 15/219,723

(22) Filed: Jul. 26, 2016

(65) Prior Publication Data
US 2018/0035363 A1    Feb. 1, 2018

(51) Int. Cl.
| | |
|---|---|
| H04W 48/16 | (2009.01) |
| H04W 8/00 | (2009.01) |
| H04L 29/08 | (2006.01) |
| H04W 64/00 | (2009.01) |
| H04W 52/02 | (2009.01) |
| H04W 88/04 | (2009.01) |

(52) U.S. Cl.
CPC ............ *H04W 48/16* (2013.01); *H04L 67/16* (2013.01); *H04W 8/005* (2013.01); *H04W 52/0229* (2013.01); *H04W 64/003* (2013.01); H04L 67/12 (2013.01); H04L 67/18 (2013.01); H04W 88/04 (2013.01); Y02D 70/00 (2018.01); Y02D 70/1242 (2018.01); Y02D 70/1262 (2018.01); Y02D 70/142 (2018.01); Y02D 70/144 (2018.01); Y02D 70/146 (2018.01); Y02D 70/164 (2018.01); Y02D 70/166 (2018.01); Y02D 70/22 (2018.01); Y02D 70/26 (2018.01)

(58) Field of Classification Search
CPC ....... H04W 4/206; H04W 8/00; H04W 8/005; H04W 48/14; H04W 48/16; H04W 48/18; H04W 52/02; H04W 52/0209; H04W 52/0219; H04W 52/0229; H04W 56/00; H04W 56/001
See application file for complete search history.

(56) References Cited

U.S. PATENT DOCUMENTS

| | | | |
|---|---|---|---|
| 7,864,744 B2 * | 1/2011 | Song | H04W 72/02 370/338 |
| 9,049,578 B2 * | 6/2015 | Abraham | H04W 4/206 |
| 9,125,124 B2 * | 9/2015 | Dwivedi | H04W 36/0083 |
| 9,258,193 B2 * | 2/2016 | Kasslin | H04L 41/12 |
| 9,398,437 B2 * | 7/2016 | Kasslin | H04L 45/745 |
| 9,439,147 B2 | 9/2016 | Huang | |
| 9,480,013 B2 * | 10/2016 | Fang | H04W 48/16 |

(Continued)

*Primary Examiner* — Hashim S Bhatti

(57) ABSTRACT

A first communication device performs a method that includes detecting a common network connection with a second communication device. The method further includes determining to perform neighborhood awareness networking scanning on behalf of the second communication device. When the first communication device detects a neighborhood awareness networking transmission while performing the neighborhood awareness networking scanning, it notifies the second communication device and discontinues the scanning on behalf of the second communication device.

20 Claims, 6 Drawing Sheets

(56) References Cited

U.S. PATENT DOCUMENTS

| | | |
|---|---|---|
| 9,554,344 B2 | 1/2017 | Huang et al. |
| 9,578,626 B2 * | 2/2017 | Sadasivam ........ H04W 72/0406 |
| 9,693,217 B2 * | 6/2017 | Kasslin ................. H04W 8/005 |
| 9,763,190 B2 * | 9/2017 | Abraham .......... H04W 52/0225 |
| 9,801,039 B2 | 10/2017 | Oren |
| 9,820,117 B1 * | 11/2017 | Tran ..................... H04W 4/206 |
| 2017/0019853 A1 | 1/2017 | Ghosh et al. |
| 2017/0347359 A1 | 11/2017 | Yang et al. |
| 2018/0027366 A1 | 1/2018 | Fujimori et al. |

* cited by examiner

METHOD AND APPARATUS FOR DISCOVERING NEIGHBORHOOD AWARENESS NETWORKING DEVICES USING A SURROGATE DEVICE

FIELD OF THE DISCLOSURE

The present disclosure relates generally to wireless communication and more specifically to discovering neighborhood awareness networking communication devices using a surrogate neighborhood awareness networking device.

BACKGROUND

The popularity of proximity-based social and mobile services has grown significantly over the last few years, and the expectation is that it will continue to do so for the foreseeable future as the mobile ecosystem evolves. To meet demand for such services, neighborhood awareness networking (NAN) technology, such as Wi-Fi Aware™, was developed. A NAN protocol allows for the bidirectional sharing of information directly between nearby or proximate NAN devices without the need for an intermediary device such as a base station, access point, router, or other infrastructure device and without the need for a network connection. Accordingly, a NAN protocol is a proximity-based protocol that provides for transmissions and scanning procedures which facilitate NAN devices discovering other NAN devices within range or proximity, wherein a discovered NAN device, for instance, offers information or a service meeting a specified criteria.

One shortcoming relates to the current mechanism for locating or discovering other NAN devices within range. To do this, for instance using Wi-Fi Aware™, NAN devices continuously transmit NAN discovery beacon frames while also scanning for the NAN discovery beacon frames of other NAN devices. However, the transmission of and scanning for NAN discovery beacon frames comes at a power cost. In some cases, measurements and estimates show and predict that transmitting and scanning for NAN discovery beacon frames can account for approximately 50% of a mobile device's average power consumption over the course of a day.

BRIEF DESCRIPTION OF THE FIGURES

The accompanying figures, where like reference numbers refer to identical or functionally similar elements throughout the separate views, form part of the specification and illustrate embodiments in accordance with the included claims.

Figure 1:
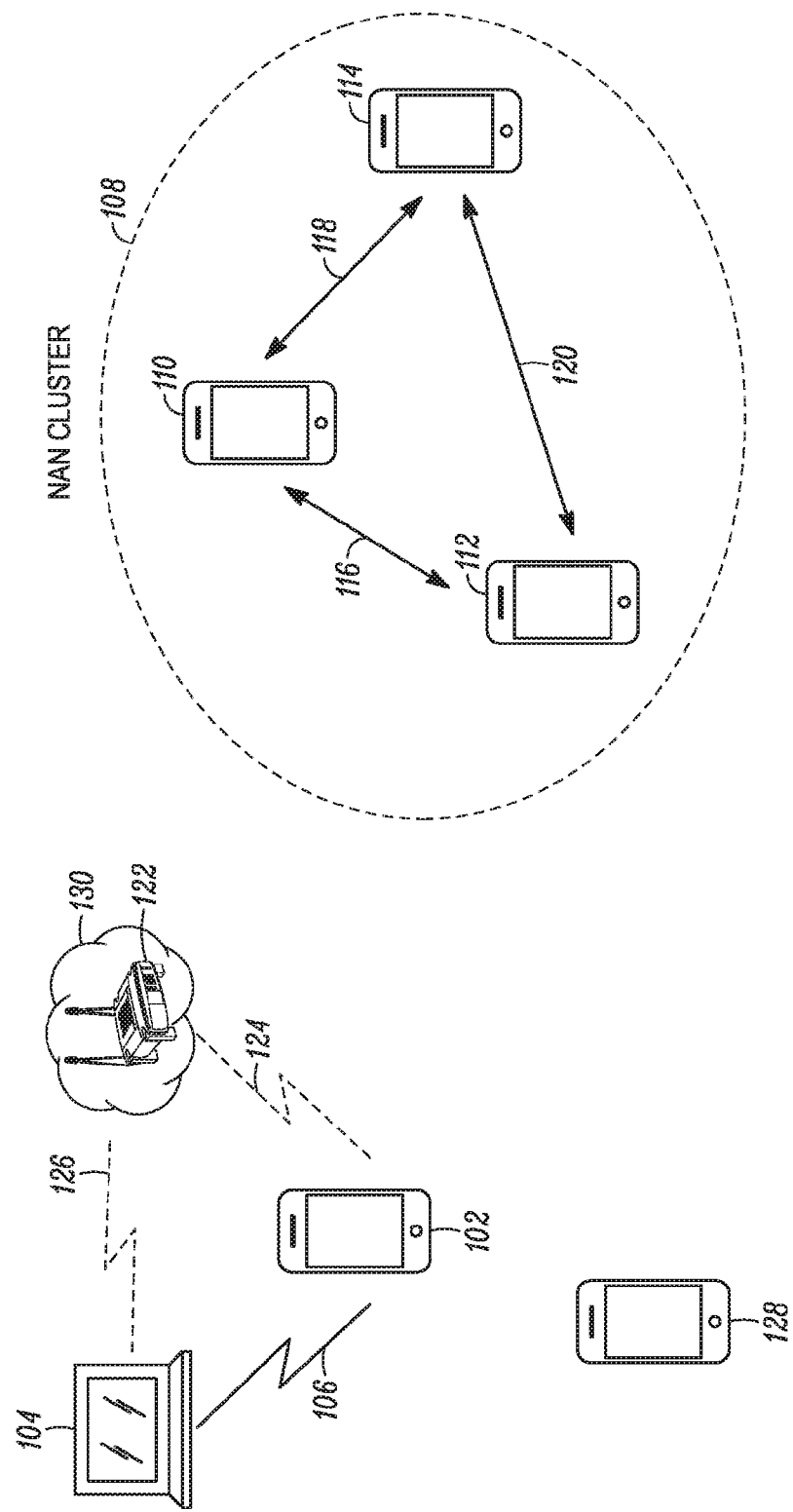
FIG. 1 shows a first communication device performing a surrogate NAN scanning role to scan for NAN communication devices on behalf of a second communication device, in accordance with some embodiments.

Skilled artisans will appreciate that elements in the figures are illustrated for simplicity and clarity and have not necessarily been drawn to scale. For example, the dimensions of some of the elements in the figures may be exaggerated relative to other elements to help to improve understanding of embodiments of the present teachings. In addition, the description and drawings do not necessarily require the order presented. It will be further appreciated that certain actions and/or steps may be described or depicted in a particular order of occurrence while those skilled in the art will understand that such specificity with respect to sequence is not actually required.

The apparatus and method components have been represented, where appropriate, by conventional symbols in the drawings, showing only those specific details that are pertinent to understanding the embodiments of the present teachings so as not to obscure the disclosure with details that will be readily apparent to those of ordinary skill in the art having the benefit of the description herein.

DETAILED DESCRIPTION

Generally speaking, pursuant to various embodiments described herein, the present disclosure provides a method and apparatus for the discovery of NAN communication devices. More specifically, a first communication device and a second communication device share a common network connection. The first communication device includes at least one network interface coupled to a processor (also referred to herein as a processing element). The network interface is to form the common network connection with the second communication device and to receive a NAN transmission. The processor is to determine to perform a surrogate NAN scanning role relative to the second communication device (which correspondingly performs a subordinate NAN scanning role), detect the NAN transmission while performing the surrogate scanning role, and notify the second communication device and determine to discontinue the surrogate scanning role in response to detecting the NAN transmission.

Thus, in accordance with described embodiments, suppressing NAN scanning can provide the second communication device the benefit of power savings over executing unsuppressed NAN scanning. This benefit is enhanced when, for example, the second communication device has a lower power capability, e.g., less battery charge, lack of access to an alternating current (AC) power source, etc., relative to the first communication device.

NAN communication devices, also referred to simply as communication devices or NAN devices, are electronic devices configured to operate in accordance with a NAN protocol, such as Wi-Fi Aware™, by sending and scanning for NAN transmissions, such as NAN discovery beacon frames, NAN synchronization beacon frames, and NAN service discovery frames, in order to discover other NAN devices. NAN discovery beacon frames are also referred to simply as discovery beacon frames. A non-exhaustive list of electronic devices which can operate as NAN devices includes smartphones, phablets, tablets, laptops, e-book readers, portable media players, portable gaming devices, athletic monitoring devices, GPS navigation devices, desktop computers, and servers.

FIG. 1 shows a NAN device 102 having a common network connection with a NAN device 104; wherein a first, e.g., 104, of these two NAN devices performs scanning, on behalf of a second, e.g., 102, of these two NAN devices, to discover other NAN devices. Communication devices having a common network connection means that the communication devices are, during some time period, simultaneously connected to the same network.

For one example, the NAN devices 102 and 104 have a common network connection by virtue of a direct wireless link 106 formed between the devices, such that the devices can communicate without using an intermediary device. The direct link 106 can be formed, for instance, using a wireless peer-to-peer (P2P) technology, such as Miracast, LTE-Direct, WiFi-Direct, Tunneled Direct Link Setup, Bluetooth low-energy (BLE), or any other suitable technology that enables establishing direct wireless links.

For another example, the NAN devices 102 and 104 have a common network connection by virtue of the devices both being connected to a same wireless network 130 such that the devices can communicate using an intermediary device, such as a base station or access point. As a particular illustration, the NAN devices 102 and 104 can have a common network connection when the NAN device 102 forms a wireless link 124 with an access point 122 within the Wi-Fi network 130 during a same time period that the NAN device 104 forms a wireless link 126 with the access point 122.

For another example, the NAN devices 102 and 104 have a common network connection by virtue of a wired connection, such as a USB connection, between the devices 102, 104. For another example, the NAN devices 102 and 104 have a common network connection by virtue of direct communications between the devices using another protocol such as, a NAN protocol, a near-field communication (NFC) protocol, or another short-range wireless communication protocol. For another example, the NAN devices 102 and 104 have a common network connection by virtue of the devices both being connected to the network 130 using a different type of wireless communication technology such as a cellular technology or a different wireless local area technology (WLAN) technology. Additionally, the NAN devices 102 and 104 can have a common network connection by virtue of the devices being connected using any other suitable ad hoc or non-ad hoc wireless technology.

Also shown are three NAN devices 110, 112, 114 operating in a NAN cluster 108 and an isolated NAN device 128 not belonging to a NAN cluster. The NAN devices 102, 104, 110, 112, 114, and 128 are configured to implement a NAN protocol by which these devices 102, 104, 110, 112, 114, 128 transmit NAN discovery beacon frames and scan for NAN discovery beacon frames transmitted by other NAN devices to facilitate the discovery of NAN devices and NAN clusters. For a particular embodiment, the NAN devices 102, 104, 110, 112, 114, and 128 are configured in accordance with the "Neighbor Awareness Networking Technical Specification," Version 1.0, hereinafter "NANTSv1.0," issued by the Wi-Fi Alliance with regard to its Wi-Fi Aware™ program to transmit and scan for NAN discovery beacon frames, which are modified IEEE 802.11 beacon management frames. A more detailed description of a NAN device transmitting NAN discovery beacon frames and scanning for NAN discovery beacon frames is provided by reference to FIG. 5.

Figure 5:
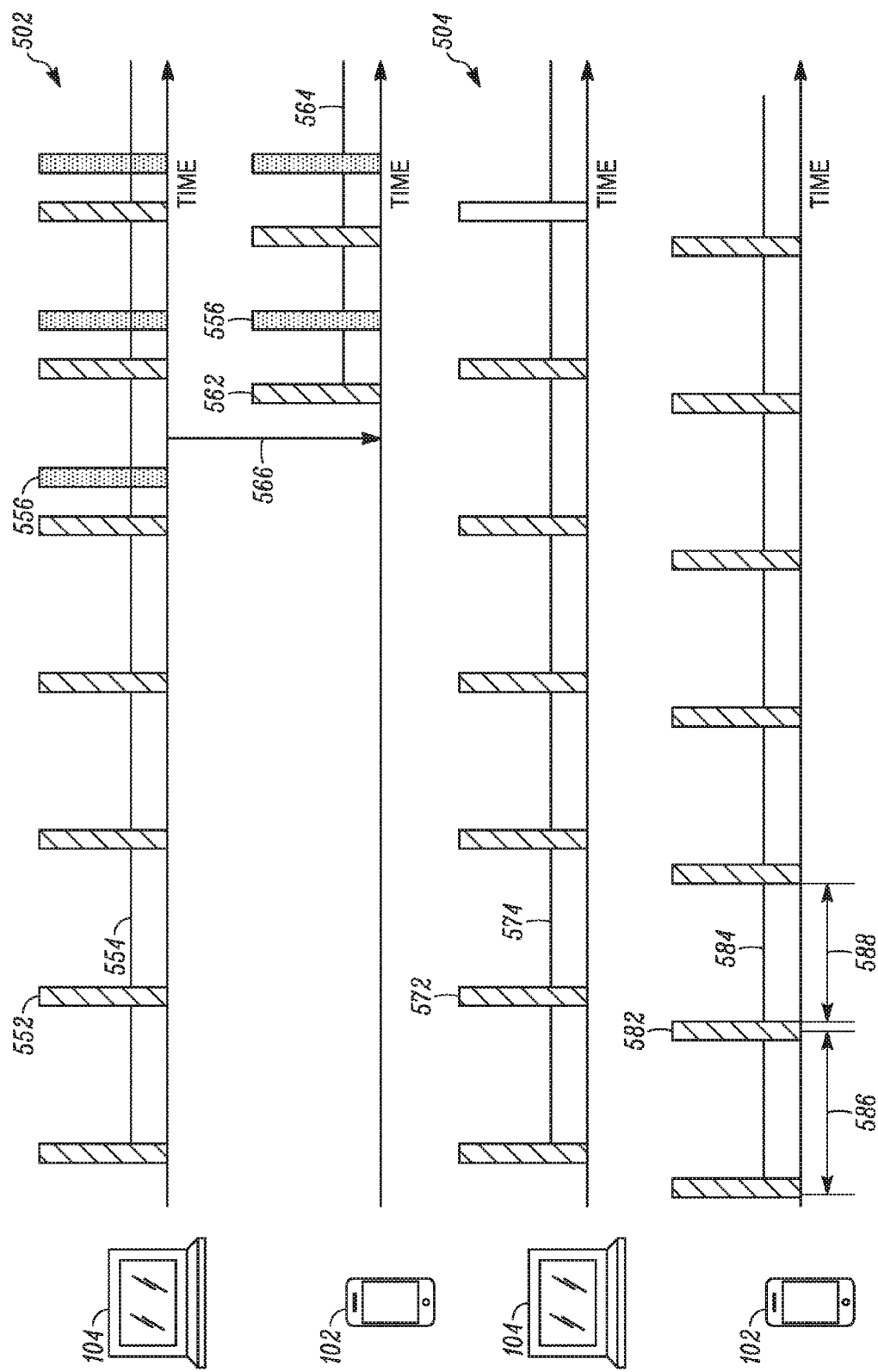
FIG. 5 shows a schematic diagram of a first communication device performing NAN scanning on behalf of a second communication device and the second communication device suppressing NAN scanning, in accordance with some embodiments.

Turning momentarily to FIG. 5, a second 504 of two pictured presentations 502 and 504 shows the NAN device 102 transmitting NAN discovery beacon frames 582 and performing NAN scanning 584 between the transmissions of the NAN discovery beacon frames 572. Presentation 504 also shows the NAN device 104 transmitting NAN discovery beacon frames 572 and performing NAN scanning 574 between the transmissions of the NAN discovery beacon frames 572. Using the presentation 504, the NAN device 102 performing unsuppressed NAN scanning 584 and unsuppressed transmitting of the NAN discovery beacon frames 582 is described next in detail. This description also applies to the NAN device 104 performing unsuppressed NAN scanning 574 and unsuppressed transmitting of the NAN discovery beacon frames 572, although a similar detailed description is not repeated for brevity.

As used herein, a time interval between consecutive NAN discovery beacon frames transmitted by the same NAN device is referred to as an "interframe time interval." An interframe time interval for the NAN discovery beacon frames 582 is indicated in presentation 504 at 586. The NANTSv1.0 specifies a time between consecutive NAN discovery beacon frames transmitted by the same NAN device of between 50 time units (TUs) and 200 TUs. However, for some embodiments, the interframe time interval is longer than 200 TUs.

For some embodiments, a TU is an arbitrary unit of time that indicates a relative relationship between times specified herein and/or with times indicated in TUs appearing within the NANTSv1.0 and other technical specifications directed to NAN operations. In other embodiments, a TU represents 1024 microseconds, in accordance with one or more of the Institute of Electrical and Electronics Engineers (IEEE) 802.11 standards. For a particular embodiment, a TU is equivalent to a millisecond.

Indicated at 588 is a scanning time interval for the NAN device 102. A scanning time interval is the length of time a NAN device scans for NAN discovery beacon frames of other NAN devices between transmissions of its own NAN discovery beacon frames. In presentation 504, for example, the NAN devices 102 and 104 continuously scan 584, 574, respectively, for NAN discovery beacon frames of other NAN devices from the termination of its own NAN discovery beacon frame 582, 572, respectively, to the beginning of its next NAN discovery beacon frame.

The NAN discovery beacon frames 582 and 572 make the NAN devices 102 and 104 discoverable to the NAN device 128, provided that the NAN device 128 is performing NAN scanning and is within range to receive the NAN discovery beacon frames 582 and 572. Similarly, the NAN devices 102 and 104, while scanning 584, 574, discover the NAN device 128 when the devices 102, 104 receive NAN discovery beacon frames from the NAN device 128.

Carried within NAN discovery beacon frames are NAN information elements (IEs). Furthermore, NAN attributes are incorporated in the NAN IEs, which, for some embodiments, adhere to a vendor-specific implementation. Each NAN device can both generate NAN IEs for transmission and decode received NAN IEs. A NAN IE carried by a NAN discovery beacon frame received from the NAN device 128 communicates to the NAN device 102 or 104 a service and/or information being sought or offered by the NAN device 128. If the service and/or information being sought or offered by the NAN device 128 is being offered or sought, respectively, by the NAN device 102 or 104 then the NAN device 102 or 104 form a direct connection with the NAN device 128 using a protocol sufficient to provide the service and/or information. The direct connection, using, for example, Wi-Fi direct or some other P2P, occurs without the need for local area network (LAN) or wide area network (WAN) infrastructure.

Individual NAN devices which have discovered one another can also group into a NAN cluster. A NAN cluster is a collection of NAN devices that share a common set of NAN parameters and are synchronized to the same discovery window schedule, for instance as specified in the NANTSv1.0. The NAN devices 110, 112, 114 of the NAN cluster 108 send and receive NAN transmissions between themselves, as indicated at 116, 118, and 120. Using the transmissions, the NAN devices 110, 112, 114 participate in a NAN master device selection procedure, which is based on a relative ranking of parameters between the NAN devices 110, 112, 114. The NAN device elected as master, taken to be the NAN device 110, controls the timing of cluster 108 operations. The subordinate NAN devices 112 and 114 synchronize with the master NAN device 110 to determine the discovery window schedule and the timing of NAN synchronization beacon frames.

All of the NAN devices 110, 112, 114 operating in the NAN cluster 108 transmit and receive NAN service discovery frames to communicate available services and information. Only the master NAN device 110, however, transmits NAN discovery beacon frames. The subordinate NAN devices 112, 114 discontinue transmitting NAN discovery beacon frames until such time as they assume the role of the master device or are no longer participating in the NAN cluster 108. The NAN cluster 108 is discoverable to the NAN devices 102 and 104 by NAN discovery beacon frames being transmitted by the master NAN device 110.

Figure 2:
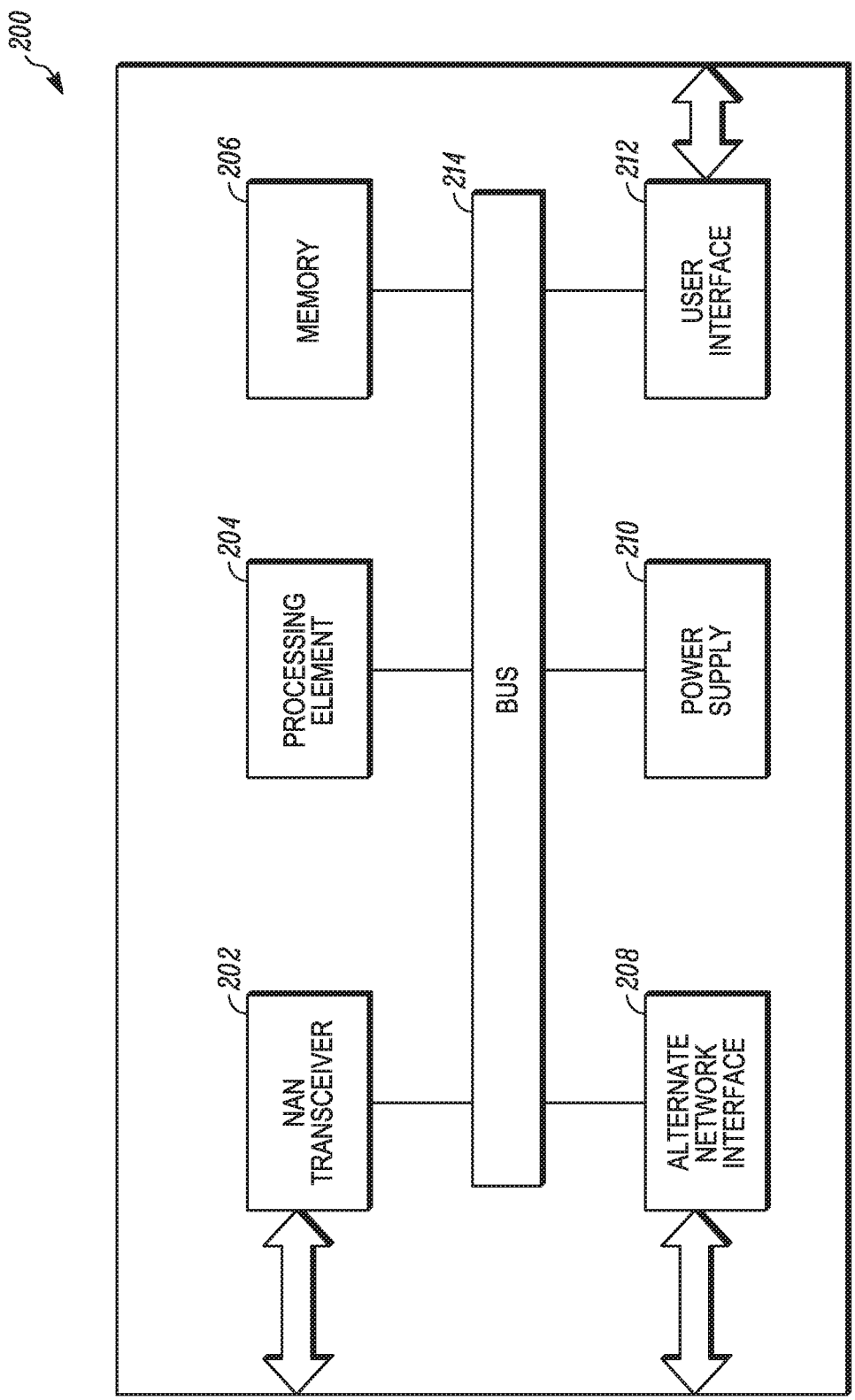
FIG. 2 shows a block diagram of a NAN communication device with internal components, in accordance with some embodiments.

FIG. 2 shows a block diagram of a NAN device 200 in accordance with embodiments of the present teachings. For a particular embodiment, the NAN device 200 represents the NAN devices 102 and 104. Included within the NAN device 200 is: a NAN transceiver 202; a processing element or processor 204; memory 206; an alternate network interface 208; a power supply 210; and a user interface 212, which are all operationally interconnected by internal connections, such as a bus 214.

A limited number of device components 202, 204, 206, 208, 210, 212, 214 are shown within the NAN device 200 for ease of illustration. Other embodiments may include a lesser or greater number of components in a NAN device. Moreover, other components needed for a commercial embodiment of a NAN device that incorporates the components 202, 204, 206, 208, 210, 212, 214 shown for the NAN device 200 are omitted from FIG. 2 for clarity in describing the enclosed embodiments.

In general, one or more of the device components 202, 204, 206, 208, 210, 212, 214 are configured with functionality in accordance with embodiments of the present disclosure as described herein with respect to the remaining figures. "Configured," "adapted," "operative," or "capable," as used herein, means that indicated components are implemented using one or more hardware elements, which may or may not be programmed with software and/or firmware, as the means for the indicated components to implement their desired functionality. For an example, at least one of the components 202, 204, 206, 208, 210, 212, 214 can be configured through executing algorithms consistent with the diagrams shown in FIGS. 3, 4, 5 and 6 and the accompanying description.

For one embodiment, the NAN device 104 uses one or more of the components 202, 204, 206, 208, 210, 212, 214 to perform a method for NAN scanning on behalf of another NAN device, such as the NAN device 102, for instance, as described below by reference to FIG. 3. The method includes detecting a common network connection with a second communication device. The method further includes determining to perform NAN scanning on behalf of the second communication device and detecting a NAN transmission while performing the NAN scanning. The method also includes notifying the second communication device and discontinuing the NAN scanning on behalf of the second communication device in response to detecting the NAN transmission.

For another embodiment, the NAN device 102 uses one or more of the components 202, 204, 206, 208, 210, 212, 214 to perform a method for suppressing NAN scanning to allow NAN scanning on its behalf by another NAN device, such as the NAN device 104, for instance as described below by reference to FIG. 4. The method includes detecting a common connection with a first communication device and suppressing NAN scanning. The method further includes receiving a notification from the first communication device, wherein the notification indicates a detected NAN transmission, and discontinuing the suppressing of the NAN scanning in response to receiving the notification.

More particularly regarding the operation of the components 202, 204, 206, 208, 210, 212, 214, the processing element 204, for instance, includes arithmetic logic and control circuitry necessary to perform the digital processing, in whole or in part, for the NAN device 200 to perform surrogate NAN scanning on behalf of another NAN device or for the NAN device 200 to suppress NAN scanning while performing a subordinate NAN scanning role, in accordance with described embodiments for the present teachings. For one embodiment, the processing element 204 represents a primary microprocessor, also referred to as a central processing unit (CPU), of the NAN device 200. For example, the processing element 204 can represent an application processor of a tablet. In another embodiment, the processing element 204 is an ancillary processor separate from the CPU, for instance included within or used with the NAN transceiver 202 or the alternate network interface 208, wherein the ancillary processor is dedicated to providing the processing capability, in whole or in part, needed for the components 202, 206, 208, 210, 212, 214 of the NAN device 200 to perform at least some of their intended functionality.

For example, the processing element 204 performs NAN functionality by implementing a NAN protocol to transmit and scan for NAN transmissions. For a particular embodiment, the processing element 204 implements a NAN discovery engine that creates, decodes, and filters NAN discovery frames such as NAN discovery beacon frames and NAN service discovery frames. The processing element 204 further implements a NAN medium access control (MAC) protocol that: coordinates with the NAN transceiver 202 to look, e.g., scan, for received frames and determine whether the received frames are NAN discovery frames; coordinates with the NAN transceiver 202 to transmit NAN discovery frames; forwards detected NAN discovery frames to the NAN discovery engine for decoding and filtering; and obtains and maintains synchronization in a NAN cluster within which the NAN device 200 is operating.

The memory 206 provides storage of electronic data used by the processing element 204 in performing its functionality. For example, the processing element 204 can use the memory 206 to load applications, save settings, and/or store files associated with the discovery of and communication with other NAN devices. In one embodiment, the memory 206 represents random access memory (RAM). In other embodiments, the memory 206 represents volatile or non-volatile memory. For a particular embodiment, a portion of the memory 206 is removable. For example, the processing element 204 can use RAM to cache data while it uses a micro secure digital (microSD) card to store files associated with functionality performed in conjunction with discovering NAN devices.

The NAN transceiver 202 is a network interface that includes components which allow it to both send and receive NAN transmissions, such as NAN transmissions identified in the NANTSv1.0. In some embodiments, these transmissions are sent and received on Wi-Fi channel 6 (2.437 GHz) in the 2.4 GHz frequency band. In other embodiments, the transmissions are sent and received on Wi-Fi channel 44 (5.220 GHz) and/or channel 149 (5.745 GHz) in the 5 GHz frequency band. For described embodiments, NAN transmissions include NAN discovery beacon frames and NAN service discovery frames, such as publish and/or subscribe messages.

The alternate network interface 208 can include a transceiver configured to send and receive wireless transmissions that are not NAN transmissions. For some embodiments, the alternate network interface 208 includes a WLAN transceiver that enables the NAN device 200 to access the Internet using standards such as Wi-Fi or WiGig and/or a cellular transceiver that enables the NAN device 200 to engage in information exchange sessions, such as calls or message exchange sessions, with other communication devices using one or more cellular networks. An example Wi-Fi transceiver operates in accordance with an IEEE 802.11 (e.g., a, b, g, n, ac, or ad) standard to communicate with other devices in the 2.4 GHz, 3.65 GHz, 4.9 GHz, 5 GHz, 5.9 GHz, and/or 60 GHz frequency bands. An example cellular transceiver uses: 3G wireless technologies such as CDMA2000 and Universal Mobile Telecommunications System ("UMTS") networks; 4G technologies such as Long-Term Evolution (LTE) and WiMAX; or 5G technologies.

For other embodiments, the alternate network interface 208 enables the NAN device 200 to establish direct links, short-range links, or otherwise engage in direct communications with another communication device without using an intermediary device. Additionally, the alternate network interface 208 can facilitate a wired connection with another communication device.

The user interface 212 represents a set of one or more components that allow for communication between the NAN device 200 and a user, owner, and/or programmer of the NAN device 200. In some embodiments, the user interface 212 includes an input component, such a keypad, which allows an individual to enter data into the NAN device 200. A user, for example, might use the input component 212 to provide an application executing on the NAN device 200 with criteria by which particular services in which the user is interested may be identified. In other embodiments, the user interface 212 includes an output component, such a display or speaker, which allows an individual to receive information from the NAN device 200. The NAN device 200 might present notifications of available services for which the user has indicated interest. For additional embodiments, the user interface 212 includes both an input component and an output component, which allow for a bi-directional flow of information between the user and the NAN device 200. The NAN device 200, for example, might include a touchscreen configured for displaying images and text and also for receiving tactile input.

The power supply 210 represents a power source that supplies electric power to the device components 202, 204, 206, 208, 212, 214, as needed, during the course of their normal operation. The power is supplied to meet the individual voltage and load requirements of the device components 202, 204, 206, 208, 212, 214 that draw electric current. For some embodiments, the power supply 210 is a wired power supply that provides direct current from alternating current using a full- or half-wave rectifier. For other embodiments, the power supply 210 is a battery that powers up and runs a portable NAN device. For a particular embodiment, the battery 210 is a rechargeable power source. A rechargeable power source for a NAN device is configured to be temporarily connected to another power source external to the NAN device to restore a charge of the rechargeable power source when it is depleted or less than fully charged. In another embodiment, the battery 210 is simply replaced when it no longer holds sufficient charge.

Figure 3:
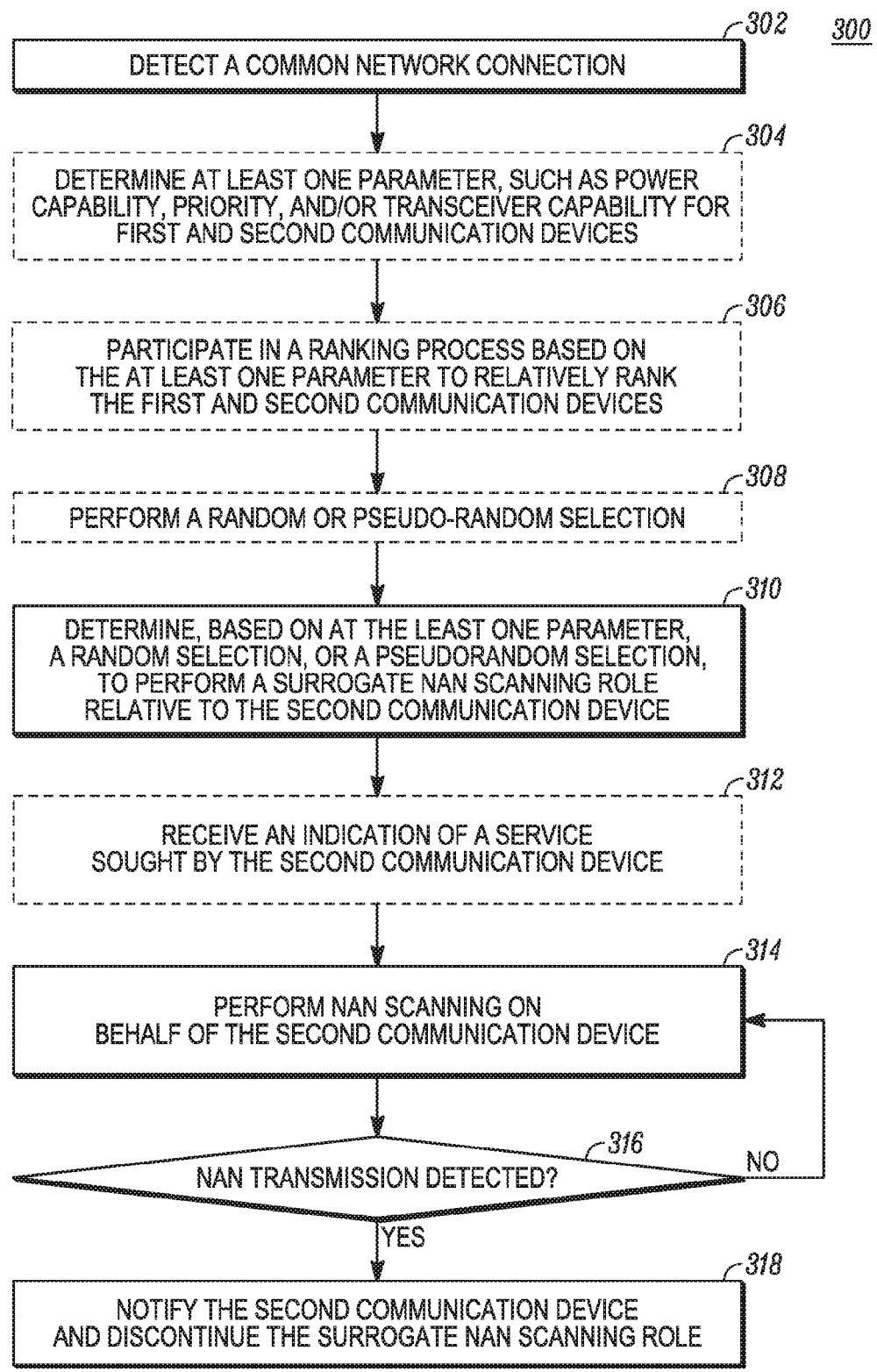
FIG. 3 shows a logical flow diagram illustrating a method for a first communication device to perform NAN scanning on behalf of a second communication device, in accordance with some embodiments.

A detailed description of the functionality of a first communication device, taken in this example to be the NAN device 104 shown in FIG. 1, using the components shown in FIG. 2 is provided with reference to FIGS. 3 and 5. FIG. 3 shows a logical flow diagram illustrating a method 300 performed by the NAN device 104, for instance, for performing NAN scanning on behalf of a second communication device, taken in this example to be the NAN device 102. The NAN device 104 can perform the method 300 relative to one other NAN device or relative to multiple NAN devices for which the NAN device 104 has a common network connection.

At block 302, the NAN device 104 detects a common network connection with the NAN device 102. For example, the NAN device 104 detects that it is connected to the same Wi-Fi network as the NAN device 102. For instance, the laptop 104 and smartphone 102 of a user are connected, as indicated at 126 and 124, respectively, to the Wi-Fi network 130 of a local library. The smartphone 102 and laptop 104 exchange messages through the Wi-Fi network 130 which enable the communication devices 102 and 104 to know that they are connected to the same Wi-Fi network 130. For another example, the laptop 104 and smartphone 102 have a direct, e.g., USB, BLE, Wi-Fi Direct, TDLS, etc., connection, which the NAN device 104 detects.

Since it was determined 302 that both communication devices 102 and 104 have a common network connection, the NAN device 104 determines 310 to perform a surrogate NAN scanning role relative to the NAN device 102. In other words, the NAN device 104 determines 310 to and performs 314 NAN scanning on behalf of the NAN device 102. The NAN device 104 performing NAN scanning "on behalf" of the NAN device 102 means that, during a time that the NAN device 102 suppresses NAN scanning, the NAN device 104 searches for a NAN transmission from another NAN device which will trigger the NAN device 104 to report back to the NAN device 102.

Presentation 502 of FIG. 5 illustrates the NAN device 104 performing NAN scanning 554 on behalf of the NAN device 102. In this particular example, the NAN device 104 sends out NAN discovery beacon frames 552 and performs unsuppressed and continuous NAN scanning 554 between the NAN discovery beacon frames 552. Continuous NAN scanning occurs without interruption, notwithstanding the duration of NAN discovery beacon frame transmissions, or other NAN transmissions, for which NAN scanning may briefly cease. In presentation 502, for example, NAN scanning 554 is continuous, occurring at every time a NAN discovery beacon frame 552, or other NAN frame, is not being transmitted. For embodiments in accordance with the NANTSv1.0, the interframe time intervals between the NAN discovery beacon frames 552 are between 50 to 200 TUs, and the scanning time intervals 554 refer to continuous NAN scanning blocks between the NAN discovery beacon frames 552.

For one embodiment, the NAN device 104 determines 310 to perform the NAN scanning on behalf of the second communication device 102 based on at least one parameter. Namely, at a block 304, the NAN device 104 determines at least one parameter for the NAN devices 102 and 104. The one or more parameters alone or in combination can include, but are not limited to, power capability, priority, and transceiver capability. For example, the NAN devices 102 and 104 exchange the parameters; the NAN device 104 receives the parameters from the NAN device 102; and/or the NAN device 102 and/or 104 derives the parameters. These can be parameters stored in the NAN devices 102 and/or 104 such as priority and transmit power or parameters determined real-time such as power capability, priority, and received signal strength.

Power capability means the power available to a communication device to operate, whether from an internal or external power source or both. Priority indicates a preference of one communication device over another communication device. Such priority can be based on, for instance; the type of communication device, e.g., a smartphone has a higher priority than a tablet; a priority set by a user of the communication device; a factory set preference; an algorithm to determine priority based on current usage, e.g., a tablet is assigned a higher priority when video is playing on the tablet, or the smartphone is assigned a higher priority during an active voice call; etc. Transceiver capability concerns for instance, quality indicators for the transceiver's operation such as transmit power, transmit range, receiver sensitivity, and received signal strength, to name a few.

The NAN device 104 participates 306 in a ranking process based on the at least one parameter to relatively rank the NAN devices 102 and 104 as to which communication device performs the surrogate NAN scanning role and which communication device performs the subordinate scanning role. The ranking process can be based on one or multiple parameters and can use any suitable algorithm.

For one example, as a result of the ranking process 306 based on power capability as a parameter, the NAN device 104 determines 310 to perform NAN scanning on behalf of the NAN device 102 based on determining that the NAN device 104 has a higher power capability than the NAN device 102. For instance, power capability can be determined based on one or more of battery capacity, instantaneous drain, remaining batter charge, whether connected to a wall socket or not, etc. In one example scenario, the NAN device 104 is connected to wall socket, while the NAN device 102 is not; so the NAN device 104 performs the surrogate NAN scanning role. In another example scenario, the NAN device 104 has more remaining battery charge than the NAN device 102; so the NAN device 104 performs the surrogate NAN scanning role. For another example scenario, the NAN device 102 is a lower-powered paired smaller device (e.g., a smartwatch, smart glasses, etc.) to the NAN device 104; so the NAN device 104 performs the surrogate NAN scanning role.

For another example, as a result of the ranking process 306 based on power capability as a parameter, the NAN device 104 determines 310 to perform NAN scanning on behalf of the NAN device 102 based on determining that the NAN device 104 has a lower power capability than the NAN device 102. In one example scenario, the remaining battery charge of the NAN device 104 falls below a threshold battery charge, for instance 25%. The NAN device 104 is, thereby, selected to perform the surrogate NAN scanning role to preserve the remaining battery charge of the NAN device 102, which is above the threshold battery charge.

For another example, as a result of the ranking process 306 based on priority as a parameter, the NAN device 104 determines 310 to perform NAN scanning on behalf of the NAN device 102 based on determining that the NAN device 104 has a lower priority than the NAN device 102. For one example scenario, the tablet or laptop 104 and smartphone 102 of a user are connected to the Wi-Fi network 130 at the library but neither device is connected to a wall charger. The user selects the smartphone 102 as a higher priority device to preserve the battery life of the smartphone 102 for use after leaving the library. Accordingly, the NAN device 104 performs the surrogate NAN scanning role. Alternatively, the tablet 104 is automatically selected as having a lower priority than the tablet 102 by virtue of the types of device.

For another example, as a result of the ranking process 306 based on transceiver capability as a parameter, the NAN device 104 determines 310 to perform NAN scanning on behalf of the NAN device 102 based on determining that the NAN device 104 has a higher transceiver capability than the NAN device 102. For one example scenario, where the transceiver for the NAN device 104 has a longer transmit range or transmit power capability than the NAN device 102, the NAN device 104 determines the NAN device 104 to have a higher transceiver capability. Additionally, where the transceiver for the NAN device 104 has a higher received signal strength or receiver sensitivity than the NAN device 102, the NAN device 104 determines the NAN device 104 to have a higher transceiver capability.

For another example, either no ranking process is performed or the ranking process at 306 indicates that the NAN devices 102 and 104 have equal or substantially similar parameters and no relative ranking is possible. For this example, the NAN device 104 determines 310 to perform the NAN scanning on behalf of the NAN device 102 based on a random or pseudorandom selection. For one example scenario, both devices 102 and 104 are configured with a random number generator or a pseudo-random number generator to use in performing 308 a random or pseudo-random selection. The resultant numbers from these generators, thereby, determine which device performs the surrogate NAN scanning role and which device performs the subordinate NAN scanning role. For instance, based on a particular algorithm, the NAN device 104 determines 310 to perform the surrogate NAN scanning role when it generates the higher number. Alternatively, the NAN device 104 determines 310 to perform the surrogate NAN scanning role when it generates the lower number.

While performing 314 the NAN scanning on behalf of the NAN device 102, the NAN device 104, at block 316, looks for a NAN transmission. The NAN device 104 continues in this surrogate NAN scanning role until detecting a NAN transmission, at which time the NAN device 104 notifies 318 the NAN device 102 and discontinues the surrogate NAN scanning role. For various embodiments, the NAN device 104 determining the detected transmission is a NAN transmission includes determining that the detected transmission has an information element identifying the detected transmission as a NAN transmission.

In some embodiments, the information element includes an organization unit identifier (OUI) which uniquely identifies a vendor, manufacturer, or other organization associated with the detected transmission. The OUI, in turn, includes an indication which identifies the detected transmission as a NAN transmission, for instance, a hexadecimal value used in a particular field or data location of the OUI. For one embodiment, the information element is a NAN IE, incorporating NAN attributes, which is carried with NAN discovery beacon frames. When the NAN device 104 receives a NAN discovery beacon frame as a detected transmission, the NAN device 104 determines from a hexadecimal value in an OUI-Type field that the detected transmission is a NAN discovery beacon frame.

For some embodiments, the NAN device 104 determining the detected transmission is a NAN transmission includes determining that the detected transmission is part of a set of reoccurring transmissions having a periodicity of between 50 and 200 TUs. The detected transmission, for instance, is a NAN discovery beacon frame which is part of a set of periodically reoccurring NAN discovery beacon frames being transmitted by the NAN device 128 in a pattern analogous to that illustrated in presentation 504 of FIG. 5.

In accordance with the NANTSv1.0, NAN discovery beacon frames have a transmission periodicity of between 50 and 200 TUs. This is the time of transmission reoccurrence, or the interframe time interval, which is the same as the reception periodicity or the time between the reception of successive NAN discovery beacon frames. If the NAN device 104 measures a periodicity of less than 50 TUs or greater than 200 TUs, then the NAN device 104 determines the detected transmission is not a NAN discovery beacon frame. If, on the other hand, the NAN device 104 measures a periodicity of between 50 and 200 TUs, then the NAN device 104 determines the detected transmission is a NAN transmission. In a particular embodiment, the NAN device 104 further decodes the OUI of the NAN transmission to verify the detected transmission is a NAN transmission.

As illustrated in the presentation 502 of FIG. 5, the NAN device 104 performs NAN scanning 554 for the NAN device 102 (which has suppressed NAN scanning). Upon detecting a frame 556 that the NAN device 104 determines is a NAN transmission, the NAN device 104 sends 318 a notification 566 to the NAN device 102. The notification 566 can be any suitable communication or messaging to the NAN device 102.

For one example where the NAN devices 102 and 104 are connected to the same Wi-Fi network 130, the NAN devices 102 and 104 implement the Wake on Wireless LAN (WoWLAN) standard, whereby the NAN device 104 broadcasts a magic packet 566 that can be detected by the NAN device 102 as a notification to trigger the NAN device 102 to discontinue suppressing NAN scanning. Similarly, where the NAN devices 102 and 104 are connected to the same wired LAN network, the NAN devices 102 and 104 can implement the Wake-on-LAN (WoL) standard, whereby the NAN device 104 sends a magic packet 566 to trigger the NAN device 102 to discontinue suppressing NAN scanning.

For one embodiment, the NAN device 104 sends 318 the notification 566 to the NAN device 102 upon detecting any type of NAN transmission 556. Alternatively, the NAN device 104 sends 318 the notification 566 to the NAN device 102 only upon detecting a NAN transmission 556 that identifies a service sought by the NAN device 102. Thus in this embodiment, block 316 (detecting the NAN transmission) is satisfied only when a NAN transmission is detected that identifies the particular service sought by the second communication device 102.

To support this embodiment, the NAN device 104 receives 312 an indication of a service sought by the NAN device 102. For example, a document is queued by the user or an application for printing, and the NAN device 104 receives 312 an indication that the NAN device 102 seeks printing service. For one example, the NAN device 102 creates and sends to the NAN device 104 a NAN transmission, such as a NAN discovery beacon frame or a NAN service discovery frame, which includes a service ID or service descriptor attribute that identifies the printing services sought. Any other suitable messaging can be used to indicate to the NAN device 104 the particular service or services sought by the NAN device 102.

For a particular embodiment, the NAN device 104 properly detects a NAN transmission when it detects a NAN discovery beacon frame that identifies the service sought by the second communication device. For example, while scanning 554, the NAN device 104 detects a NAN discovery beacon frame 556 from a printer device 128 while the user is still in the library or when the user returns home. Upon decoding and filtering the NAN discovery beacon frame 556, the NAN device 104 matches a service ID in the NAN discovery beacon frame 556 with a service ID provided by the NAN device 102. Accordingly, the NAN device 104 notifies 318 the NAN device 102 and discontinues the surrogate NAN scanning role.

For another embodiment, the NAN device 104 properly detects a NAN transmission when it detects a NAN service discovery frame that identifies the service sought by the second communication device. For one implementation scenario, the NAN device 104 passively scans for a NAN service discovery frame that indicates, e.g., using a service ID or service descriptor attribute, the printing service sought by the NAN device 102. For instance, while scanning 554, the NAN device 104 detects a NAN discovery beacon frame send by a NAN device 110 performing a master role for a nearby NAN cluster 108. The NAN device 104 joins the NAN cluster 108 and passively scans for a NAN service discovery frame that includes a publish message which identifies a printing service.

Alternatively, the NAN device 104 actively scans 554 for the publish message. For this implementation scenario, the NAN device 104 sends a subscribe message that identifies the service sought by the second communication device, while joined to the NAN cluster 108. Accordingly, the NAN device 104 properly detects a NAN transmission when it detects a NAN service discovery frame that includes a publish message received in response to the subscribe message. The NAN device 104 can use its own internal NAN discovery engine to create the subscribe message or forward a subscribe message created and provided by the NAN device 102.

Figure 4:
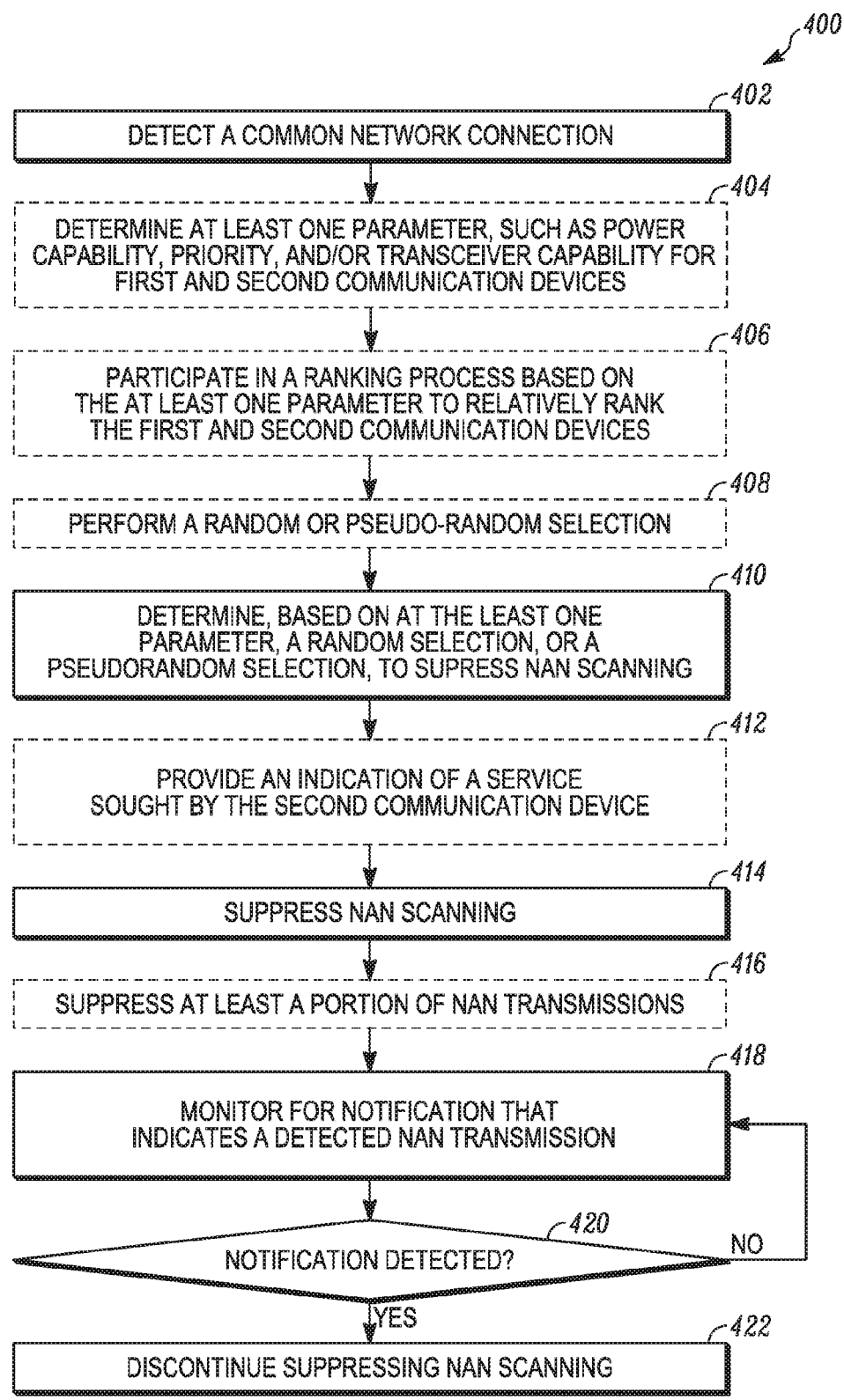
FIG. 4 shows a logical flow diagram illustrating a method performed by the second communication device for suppressing NAN scanning while the first communication device performs NAN scanning on its behalf, in accordance with some embodiments.

A detailed description of the functionality of a second communication device, e.g., the NAN device 102 shown in FIG. 1, using the components shown in FIG. 2 is provided with reference to FIGS. 4 and 5. FIG. 4, for example, shows a logical flow diagram illustrating a method 400 performed by a NAN device, taken to be the NAN device 102, for suppressing NAN scanning to allow another NAN device, in this example the NAN device 104, to perform the NAN scanning on its behalf. For some embodiments, the NAN device 102 provides 412 an indication of a service sought by the NAN device 102 for which the NAN device 104 searches.

The NAN device 102 detects 402 a common connection with the NAN device 104, and determines 410 to suppress NAN scanning, which NAN device 102 performs at block 414, thereby performing a subordinate NAN scanning role. For one embodiment, the NAN device 102 determines 404 at least one parameter, such as power capability, priority, and/or transceiver capability, for the NAN devices 102 and 104 and participates 406 in a ranking process based on the at least one parameter to relatively rank the NAN devices 102 and 104. The NAN device 102, thereby, determines 410 to suppress NAN scanning based on the results of the relative ranking. For another embodiment, the NAN device 102 performs 408 a random or pseudo-random selection by which the NAN device 102 determines 410 to suppress NAN scanning. Functionality represented by blocks 402, 404, 406, 408, and 410 can be similarly performed as the functionality represented by the corresponding blocks 302, 304, 306, 308, and 310 (of FIG. 3), respectively, the description of which is not repeated here for brevity.

The NAN device 102 suppresses 414 NAN scanning and monitors 418 for a notification that indicates a detected NAN transmission, such as monitoring for a magic packet or other suitable massage. When, at block 420, such a notification (e.g., notification 566 of FIG. 5) is detected, the NAN device 102 discontinues 422 suppressing NAN scanning. For an embodiment, the NAN device 102 begins or returns to sending NAN discovery beacon frames 562 between which the NAN device 102 continuously scans 564 for NAN transmissions to detect the NAN transmissions 556 which were detected by the NAN device 104.

Figure 6:
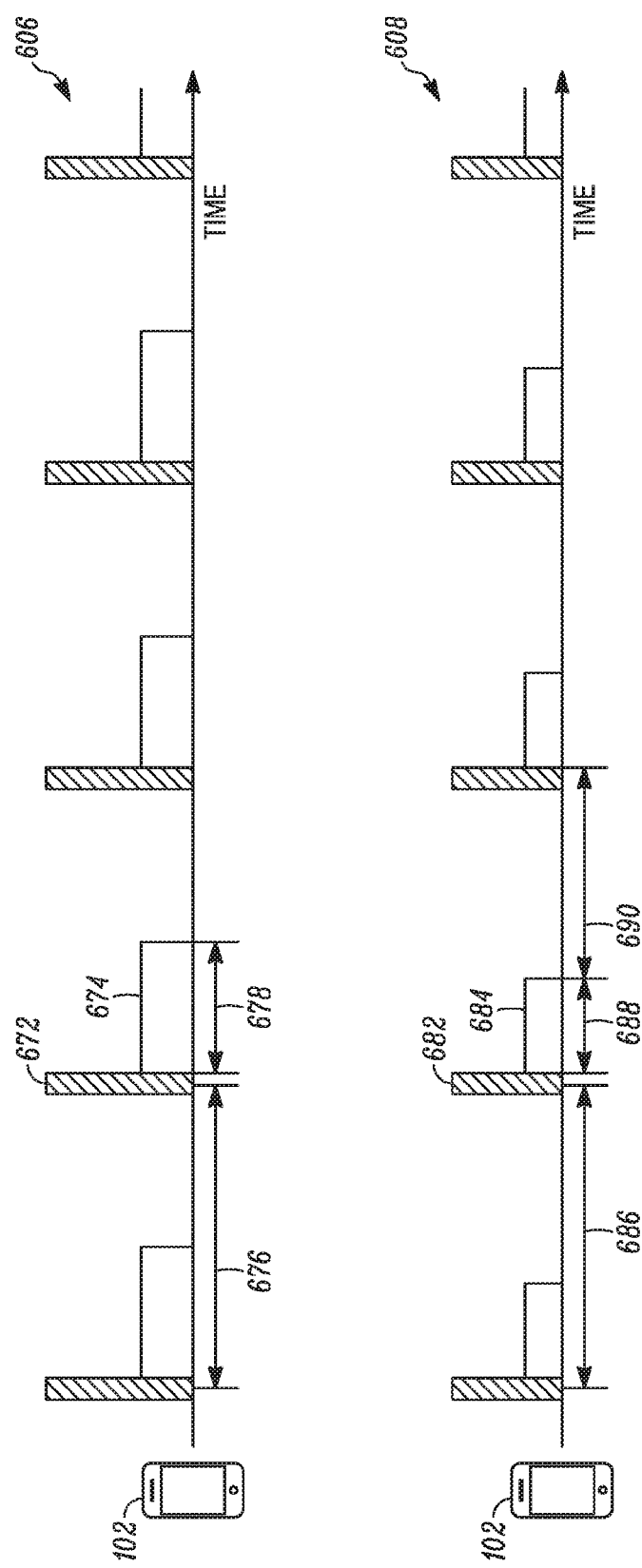
FIG. 6 shows a schematic diagram of a first communication device suppressing NAN scanning, in accordance with some embodiments.

Suppressing NAN scanning, indicated in block 414, means that scanning for NAN transmissions by the NAN transceiver 202 and processor 204 is curtailed either partially or completely in comparison to when NAN scanning is not suppressed. For some embodiments, NAN transmitting is also suppressed, as indicated in block 416, when suppressing the NAN scanning. This has the benefit of further reducing the number of NAN transmissions sent over the same channel. Turning to FIGS. 5 and 6, suppressing NAN scanning and NAN transmitting is described in further detail. The presentation 504 shown in FIG. 5, described previously, graphically represents unsuppressed NAN scanning by the NAN device 102. By contrast to the presentation 504, the presentation 502 of FIG. 5 and the presentations 606 and 608 of FIG. 6 illustrate suppressed NAN scanning.

For some embodiments, suppressing NAN scanning includes disabling NAN scanning. This is illustrated in presentation 502, which shows NAN scanning is discontinued in that it is no longer performed by the NAN transceiver 202 and processor 204 of the NAN device 102 before receiving the notification 566. Also absent from presentation 502 are any NAN discovery beacon frames transmitted by the NAN transceiver 202. This reflects an embodiment which further includes disabling a first type of NAN transmission, in this case disabling transmitting NAN discovery beacon frames, while suppressing NAN scanning. In other instances, the NAN device 102 disables transmitting NAN service discovery frames while suppressing NAN scanning. For some embodiments, NAN transmitting is disabled altogether while NAN scanning is suppressed.

For other embodiments, suppressing NAN scanning includes reducing NAN scanning as compared to unsuppressed NAN scanning. In such embodiments, NAN scanning is not completely curtailed. Presentation 606 illustrates ways in which the NAN device 102 can partially suppress NAN scanning and NAN transmitting. As compared to presentation 504, for which no suppression occurs, every other NAN discovery beacon frame is omitted from presentation 606, along with the scanning time interval that immediately followed the omitted NAN discovery beacon frames. For scanning blocks 674 and NAN discovery beacon frames 672 that remain in presentation 606, the scanning time intervals 678 are of the same length as the scanning time intervals 588, but the interframe time intervals 676 have doubled as compared to the interframe time intervals 586 for presentation 504. Accordingly, this embodiment illustrates suppressing NAN transmissions by reducing a rate of sending a first type of neighborhood awareness networking transmission.

In other embodiments, NAN scanning and NAN transmitting is suppressed by omitting different combinations of NAN discovery beacon frames and associated scanning blocks from the unsuppressed sequence in different patterns. Labeling the sequence of presentation 504, without omissions, as successive positive integers "1-2-3-4-5," and the sequence of every other NAN discovery beacon frame 672 and scanning block 674, illustrated in presentation 606, as the sequence of successive odd integers "1-3-5-7-9," for example, other embodiments of suppressed scanning and transmitting are represented by sequences "1-4-7-10-13," "1-2-4-5-7," and "1-4-5-8-9." Other embodiments represent additional sequences associated with suppressing NAN scanning and NAN transmitting.

For some embodiments, reducing NAN scanning includes NAN scanning during scanning time intervals which are discontinuous in time. Viewing the suppressed NAN scanning and NAN transmitting illustrated in presentation 606 differently, the spacing of the NAN discovery beacon frames 582 and NAN scanning blocks 584 of the unsuppressed presentation 504 is increased to yield the suppressed presentation 606. This increases the interframe time interval from that indicated at 586 to that indicated at 676. The scanning time interval 678 for scanning block 674, however, is the same as the scanning time interval 588 for scanning block 584. This results in suppressed NAN scanning that is discontinuous. The scanning blocks 674 are separated from one another by approximately the difference in time between the interframe time interval 676 and the scanning time interval 678.

Discontinuous NAN scanning occurs if there are periods of time when a NAN device both is not sending a NAN transmission and not performing NAN scanning. NAN scanning is discontinuous in presentation 608, for example. During the latter portion of time interval 690, the NAN device 102 is not performing NAN scanning or sending a NAN transmission. A scanning time interval 688, for instance, is a discontinuous scanning time interval, whereas the scanning time interval 588 is a continuous scanning time interval.

In presentation 608, discovery beacon frames 682 are distributed with an interframe time interval 686, which is similar to the interframe time interval 676 for presentation 606. In presentation 608, however, a first type of NAN transmission, in this case the transmission of the NAN discovery beacon frames 682 is further suppressed in that the NAN device 102 transmits them at a reduced power level, or reduced transmit power, as compared to the transmission of the NAN discovery beacon frames 672 or 582. Scanning is also further suppressed in that scanning blocks 684 have the scanning time interval 688, which is shorter compared to the scanning time intervals 678 and 588 for scanning blocks 674 and 584, respectively. Thus for this embodiment, suppressing NAN scanning includes reducing a scanning time interval during which the NAN scanning occurs.

For various embodiments, NAN scanning and NAN transmitting is reduced, and thereby suppressed or further suppressed, by increasing interframe time intervals. NAN scanning is also reduced, and thereby suppressed or further suppressed, by decreasing scanning time intervals. Additionally, NAN transmitting is also reduced, and thereby suppressed or further suppressed, by decreasing a transmission power level.

In one embodiment, one or more of the discontinuous scanning time intervals when NAN scanning is suppressed is shorter in time than an interframe time interval between NAN discovery beacon frames when NAN scanning is not suppressed. This is made evident by comparing presentation 608 to presentation 504. In presentation 608, the scanning time interval 688 is shorter than the interframe time interval 586 of presentation 504.

In another embodiment, one or more of the discontinuous scanning time intervals when NAN scanning is suppressed is shorter than one or more continuous scanning time intervals when NAN scanning is not suppressed. This is also made evident by comparing presentation 608 to presentation 504. In presentation 608, the scanning time interval 688 is shorter than the scanning time interval 588 of presentation 504.

In further embodiments, the discontinuous scanning time intervals are shorter than an interval of time separating the discontinuous scanning time intervals. This is illustrated in presentation 608 where the scanning time intervals 688 are shorter than an interval of time 690 separating the scanning blocks 684. For a particular embodiment, the discontinuous scanning time intervals 688 are 50 TUs or less in length, below the minimum length of time specified in the NANTSv1.0. In an embodiment having discontinuous scanning time intervals of different lengths, one or more of the discontinuous scanning time intervals is 50 TUs or less in length.

For some embodiments, reducing NAN scanning includes disabling passive NAN scanning while decreasing active NAN scanning. Active NAN scanning is reactionary scanning that occurs in anticipation of an expected response to a transmitted message. In accordance with the NANTSv1.0, for example, a NAN device may use NAN service discovery frames to actively look for availability of specific services. NAN service discovery protocol messages include publish and subscribe messages. A NAN device sends a subscribe message to solicit another NAN device to responsively transmit a publish message if response criteria are met. The NAN device 102 scanning for a response to a transmitted subscribe message exemplifies decreased active NAN scanning if the active NAN scanning occurs less frequently or on a shorter intervals of time as compared to when active NAN scanning is not being suppressed.

For other embodiments, reducing NAN scanning includes disabling active NAN scanning while decreasing passive NAN scanning. Passive NAN scanning is scanning that occurs without an expected response to a previously transmitted message. Scanning for NAN discovery beacon frames, for example, is passive NAN scanning because the NAN discovery beacon frames are not received in response to a message soliciting their transmission. Reduced NAN scanning consistent with these embodiments is illustrated by the scanning blocks 674 and 684 of presentations 606 and 608, respectively, provided that active NAN scanning is discontinued.

As mentioned earlier, when the NAN device 102 detects the notification 566 from the NAN device 104, then the NAN device 102 discontinues 422 suppressing NAN scanning. If NAN transmitting was also suppressed, as indicated at 416, then the NAN device 102 also discontinues suppressing NAN transmitting upon detecting the notification 566.

Discontinuing suppressing NAN scanning means restoring NAN scanning. If NAN scanning was discontinued in suppressing NAN scanning, then the NAN device 102 again continues to perform NAN scanning. For example, NAN scanning is restored from occurring as illustrated in presentation 502 back to occurring as illustrated in presentation 504. If NAN scanning was reduced in suppressing NAN scanning, then NAN scanning is again increased. For example, NAN scanning is restored from occurring as illustrated in presentation 606 or 608 back to occurring as illustrated in presentation 504.

Discontinuing suppressing NAN transmitting means restoring NAN transmitting. If NAN transmitting was discontinued in suppressing NAN transmitting, then the NAN device 102 again continues to perform NAN transmitting. For example, NAN transmitting is restored from occurring as illustrated in presentation 502 back to occurring as illustrated in presentation 504. If NAN transmitting was reduced in suppressing NAN transmitting, then NAN transmitting is again increased. For example, NAN transmitting is restored from occurring as illustrated in presentation 606 or 608 back to occurring as illustrated in presentation 504.

For yet another embodiment, suppressing 414 NAN scanning includes transitioning to a lower-power state from a higher-power state. Correspondingly, discontinuing 422 the suppressing of the NAN scanning includes transitioning from the lower-power state to the higher-power state. For one example, transitioning to a lower-power state includes putting the NAN device 102 into a "sleep" mode, whereby only the components needed to detect 420 the notification are provided with power. For instance, the NAN device 102 is powered only to the extent that it can detect magic packets from the NAN device 104. For another example, transitioning to a lower-power state includes disabling only NAN functionality on the NAN device 102 and leaving some other functionality implementing on the NAN device 102 such as Wi-Fi and cellular operations. Other methods of power-management can be performed in the NAN device 102 related to transitioning to the lower-power state. When transitioning to the higher-power state, the NAN device 102 restores full power to the device components or restores partial power above what is available in the lower-power state.

In the foregoing specification, specific embodiments have been described. However, one of ordinary skill in the art appreciates that various modifications and changes can be made without departing from the scope of the invention as set forth in the claims below. Accordingly, the specification and figures are to be regarded in an illustrative rather than a restrictive sense, and all such modifications are intended to be included within the scope of present teachings.

The benefits, advantages, solutions to problems, and any element(s) that may cause any benefit, advantage, or solution to occur or become more pronounced are not to be construed as a critical, required, or essential features or elements of any or all the claims. The invention is defined solely by the appended claims including any amendments made during the pendency of this application and all equivalents of those claims as issued.

Moreover in this document, relational terms such as first and second, top and bottom, and the like may be used solely to distinguish one entity or action from another entity or action without necessarily requiring or implying any actual such relationship or order between such entities or actions. The terms "comprises," "comprising," "has," "having," "includes," "including," "contains," "containing" or any other variation thereof, are intended to cover a non-exclusive inclusion, such that a process, method, article, or apparatus that comprises, has, includes, contains a list of elements does not include only those elements but may include other elements not expressly listed or inherent to such process, method, article, or apparatus. An element proceeded by "comprises . . . a," "has . . . a," "includes . . . a," or "contains . . . a" does not, without more constraints, preclude the existence of additional identical elements in the process, method, article, or apparatus that comprises, has, includes, contains the element. The terms "a" and "an" are defined as one or more unless explicitly stated otherwise herein. The terms "substantially," "essentially," "approximately," "about" or any other version thereof, are defined as being close to as understood by one of ordinary skill in the art, and in one non-limiting embodiment the term is defined to be within 10%, in another embodiment within 5%, in another embodiment within 1% and in another embodiment within 0.5%. The term "coupled" as used herein is defined as connected, although not necessarily directly and not necessarily mechanically. A device or structure that is "configured" in a certain way is configured in at least that way, but may also be configured in ways that are not listed.

It will be appreciated that some embodiments may be comprised of one or more generic or specialized processors (or "processing devices") such as microprocessors, digital signal processors, customized processors and field programmable gate arrays (FPGAs) and unique stored program instructions (including both software and firmware) that control the one or more processors to implement, in conjunction with certain non-processor circuits, some, most, or all of the functions of the method and/or apparatus described herein. Alternatively, some or all functions could be implemented by a state machine that has no stored program instructions, or in one or more application specific integrated circuits (ASICs), in which each function or some combinations of certain of the functions are implemented as custom logic. Of course, a combination of the two approaches could be used.

Moreover, an embodiment can be implemented as a computer-readable storage medium having computer readable code stored thereon for programming a computer (e.g., comprising a processor) to perform a method as described and claimed herein. Examples of such computer-readable storage mediums include, but are not limited to, a hard disk, a CD-ROM, an optical storage device, a magnetic storage device, a ROM (Read Only Memory), a PROM (Programmable Read Only Memory), an EPROM (Erasable Programmable Read Only Memory), an EEPROM (Electrically Erasable Programmable Read Only Memory) and a Flash memory. Further, it is expected that one of ordinary skill, notwithstanding possibly significant effort and many design choices motivated by, for example, available time, current technology, and economic considerations, when guided by the concepts and principles disclosed herein will be readily capable of generating such software instructions and programs and ICs with minimal experimentation.

The Abstract of the Disclosure is provided to allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in various embodiments for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separately claimed subject matter.

We claim:

1. A method performed by a first communication device, the method comprising:
    detecting, via a first network interface of the first communication device, a common network connection with a second communication device, wherein the first network interface is associated with a first communication protocol;
    determining to perform neighborhood awareness networking scanning, via a second network interface of the first communication device, on behalf of the second communication device in response to a determination that the second communication device is a subordinate device to the first communication device, wherein the second network interface is different than the first network interface and the second network interface is associated with a second communication protocol different than the first communication protocol;
    detecting, via the second network interface of the first communication device, a neighborhood awareness networking transmission while performing the neighborhood awareness networking scanning; and
    in response to the detecting of the neighborhood awareness networking transmission via the second network interface:
        notifying, via the first network interface of the first communication device, the second communication device of the detected neighborhood awareness networking transmission, and
        discontinuing the neighborhood awareness networking scanning on behalf of the second communication device.

2. The method of claim 1, wherein the determining to perform the neighborhood awareness network scanning on behalf of the second communication device is based on at least one parameter.

3. The method of claim 2, wherein the at least one parameter comprises power capability, and wherein the determining to perform the neighborhood awareness networking scanning is based on determining that the first communication device has a higher power capability than the second communication device.

4. The method of claim 2, wherein the at least one parameter comprises power capability, and wherein the determining to perform the neighborhood awareness networking scanning is based on determining that the first communication device has a lower power capability than the second communication device.

5. The method of claim 2, wherein the at least one parameter comprises priority, and wherein the determining to perform the neighborhood awareness networking scanning is based on determining that the first communication device has a lower priority than the second communication device.

6. The method of claim 2, wherein the at least one parameter comprises transceiver capability, and wherein the determining to perform the neighborhood awareness networking scanning is based on determining that the first communication device has a higher transceiver capability than the second communication device.

7. The method of claim 1, wherein the detected neighborhood awareness transmission identifies a service sought by the second communication device.

8. The method of claim 7, wherein the detecting of the neighborhood awareness networking transmission comprises detecting a neighborhood awareness networking service discovery frame that identifies the service sought by the second communication device.

9. The method of claim 8, wherein the detected neighborhood awareness networking service discovery frame comprises a publish message received in response to transmitting a subscribe message that identifies the service sought by the second communication device.

10. The method of claim 1, wherein the determining to perform the neighborhood awareness network scanning on behalf of the second communication device is based on a random or pseudorandom selection.

11. A method performed by a second communication device, the method comprising:
    detecting, via a first network interface of the second communication device, a common connection with a first communication device, wherein the first network interface is associated with a first communication protocol;
    suppressing neighborhood awareness networking scanning, via a second network interface of the second communication device, in response to a determination that the second communication device is a subordinate device to the first communication device, wherein the second network interface is different than the first network interface and the second network interface is associated with a second communication protocol different than the first communication protocol;
    receiving, via the first network interface of the second communication device, a notification from the first communication device, wherein the notification indicates a detected neighborhood awareness networking transmission; and
    discontinuing the suppressing of the neighborhood awareness networking scanning in response to the receiving of the notification.

12. The method of claim 11 further comprising participating in a ranking process to determine a relative ranking between the first and second communication devices based on at least one parameter, and wherein the suppressing of the neighborhood awareness networking scanning is based on the relative ranking.

13. The method of claim 11, wherein the suppressing of the neighborhood awareness networking scanning comprises disabling the neighborhood awareness networking scanning.

14. The method of claim 11, wherein the suppressing of the neighborhood awareness networking scanning comprises reducing a scanning time interval during which the neighborhood awareness networking scanning occurs.

15. The method of claim 11, wherein:
    the suppressing of the neighborhood awareness networking scanning comprises transitioning to a lower-power state from a higher-power state; and
    the discontinuing of the suppressing of the neighborhood awareness networking scanning comprises transitioning from the lower-power state to the higher-power state.

16. The method of claim 11 further comprising suppressing at least one type of neighborhood awareness networking transmission when suppressing the neighborhood awareness networking scanning.

17. The method of claim 16, wherein the suppressing of the at least one type of neighborhood awareness networking transmission comprises disabling a first type of neighborhood awareness networking transmission.

18. The method of claim 16, wherein the suppressing of the at least one type of neighborhood awareness networking transmission comprises reducing a rate of sending a first type of neighborhood awareness networking transmission.

19. The method of claim 16, wherein the suppressing of the at least one type of neighborhood awareness networking transmission comprises reducing a transmit power for sending a first type of neighborhood awareness networking transmission.

20. A first communication device comprising:
    a first network interface to:
        form a common network connection with a second communication device, wherein the first network interface is associated with a first communication protocol;
    a second network interface to:
        receive a neighborhood awareness networking transmission, wherein the second network interface is different than the first network interface and the second network interface is associated with a second communication protocol different than the first communication protocol; and
    a processor coupled to the first network interface and the second network interface, the processor to:
        determine to perform a surrogate neighborhood awareness networking scanning role relative to the second communication device in response to a determination that the second communication device is a subordinate device to the first communication device;
        detect, via the second network interface, the neighborhood awareness networking transmission while performing the surrogate scanning role; and
        in response to the detecting of the neighborhood awareness networking transmission:
            notify, via the first network interface, the second communication device of the detected neighborhood awareness networking transmission, and
            determine to discontinue the surrogate scanning role.

* * * * *